Sept. 30, 1952  J. B. TAVANO  2,612,009
MACHINE FOR MITERING AND CUTTING FINGER GRIPS IN GLASS
Filed Sept. 1, 1949  2 SHEETS—SHEET 1

INVENTOR:-
JOHN B. TAVANO
BY
H. G. Manning
ATTY.

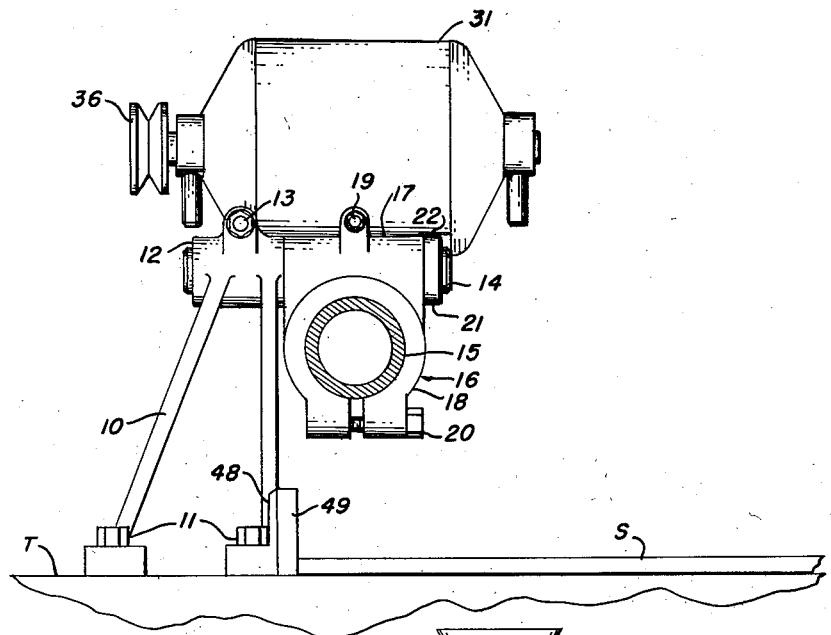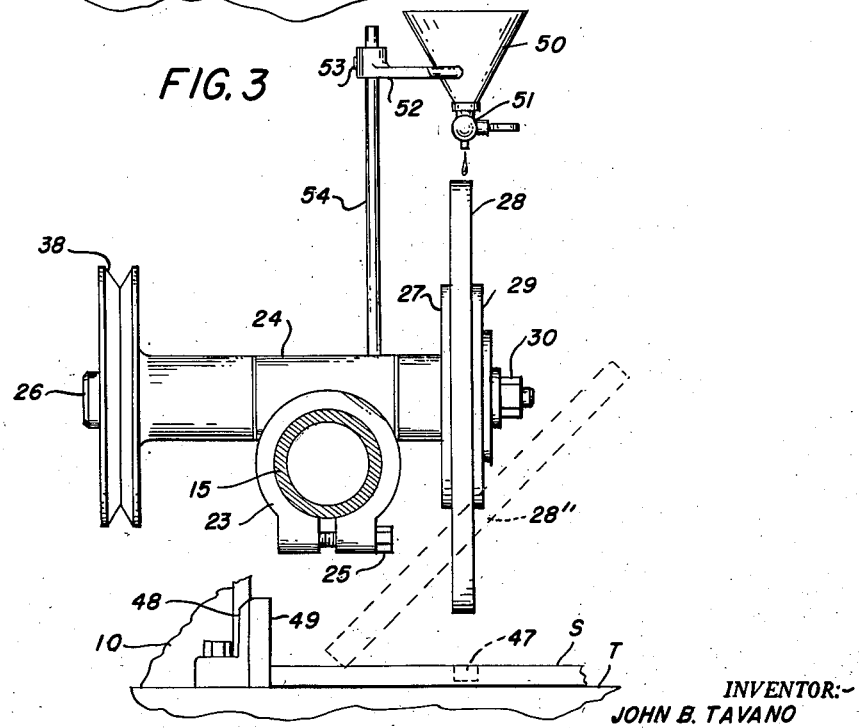

Patented Sept. 30, 1952

2,612,009

UNITED STATES PATENT OFFICE 2,612,009

MACHINE FOR MITERING AND CUTTING FINGER GRIPS IN GLASS

John B. Tavano, Waterbury, Conn.

Application September 1, 1949, Serial No. 113,625

2 Claims. (Cl. 51—166)

This invention relates to glass cutting machines of the type having a rotating abrasive wheel, and more particularly to a machine of this type in which the wheel is adjustably supported so that it may be used to produce mitered edges, stripes, finger grips, and other special formations in sheets of glass.

One object of this invention is to provide a machine of the above nature wherein the abrasive wheel is mounted upon a vertically swingable beam which is longitudinally adjustable, whereby the beam and the wheel thereon may be completely or partially counterbalanced in any desired degree.

Another object is to provide a machine of the above nature in which the beam is adjustably supported in such a manner that the plane of the abrasive wheel may be disposed and held at any desired inclination with respect to a glass sheet, whereby the glass may be provided with recesses of various configurations, such as V-shaped grooves, or crescent-shaped finger grips.

Another object is to provide a machine of the above nature having means whereby the depth of the cut in the glass may automatically be limited.

Another object is to provide a machine of the above nature in which the abrasive wheel will be firmly held against vibration or deflection from its desired position, whereby said wheel will produce clean cuts in the glass without chipping or blurring thereof.

A further object is to provide a machine of the above nature which will be simple in construction, inexpensive to manufacture, easy to install and manipulate, compact, ornamental in appearance, and very efficient and durable in use.

With these and other objects in view, there has been illustrated on the accompanying drawing one form in which the invention may conveniently be embodied in practice.

In the drawing,

Fig. 2 is a cross sectional view of the same, taken substantially on the line 2—2 of Fig. 1.

Fig. 3 is a cross sectional view of the same, taken substantially on the broken line 3—3 of Fig. 1, dotted lines being added to show an inclined operating position to which the abrasive wheel may be adjusted.

Figure 1:
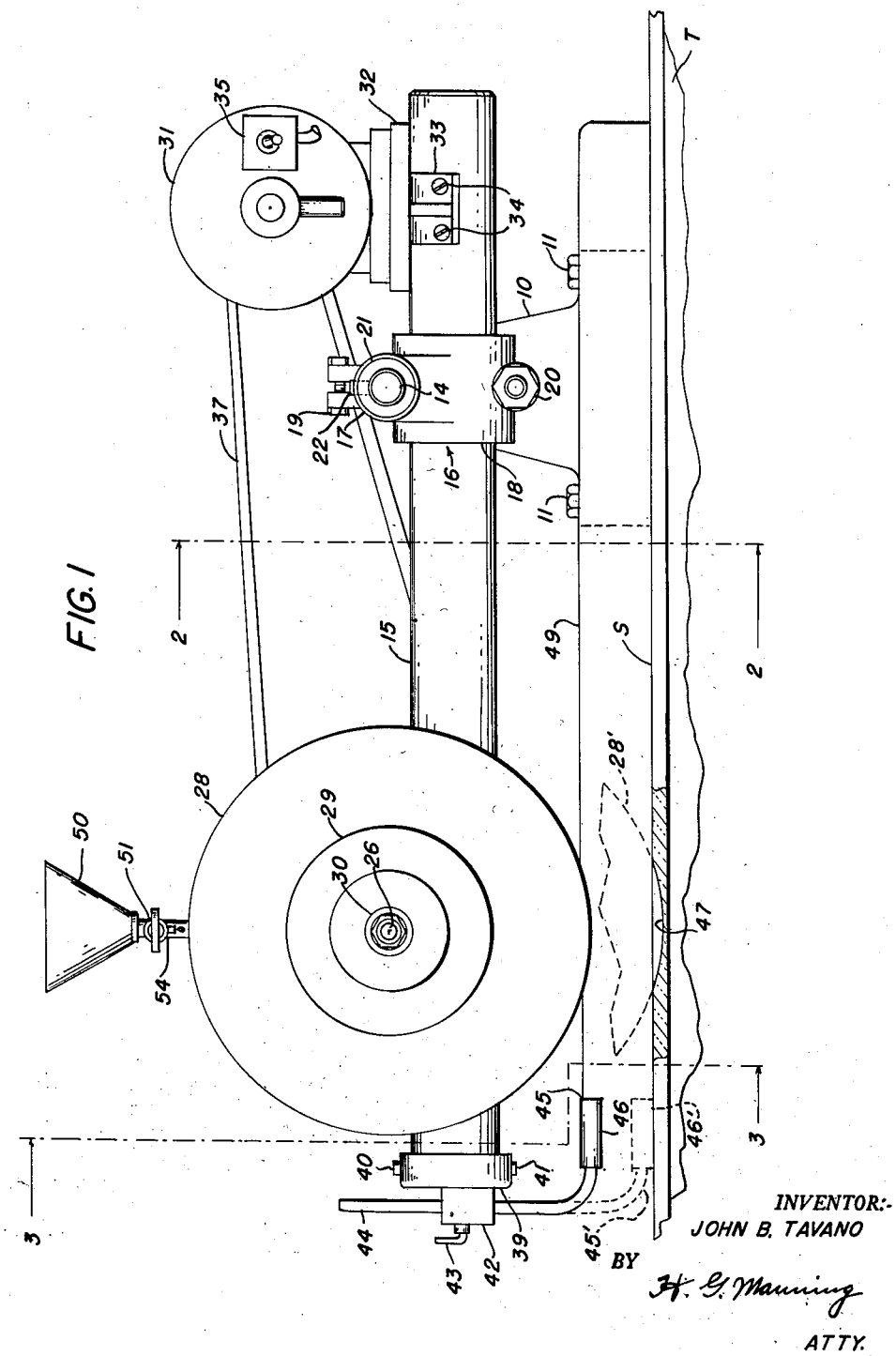
Fig. 1 is a side view, showing the improved glass mitering and cutting machine as it would appear when mounted on a supporting table, the operating positions of the wheel and the stop rod with relation to a sheet of glass being indicated by dotted lines.

Referring now to the drawings, in which like reference numerals denote corresponding parts throughout the several views, the numeral 10 indicates a pedestal which is adapted to be secured upon the flat top of a glass-supporting table T by means of screws 11—said pedestal having an upper split sleeve 12 (Fig. 2) in which a horizontal rock shaft 14 is adapted to be clamped by screw means 13.

In order to support a tubular beam 15 for vertical swinging movement upon the rock shaft 14, provision is made of a bracket 16 comprising a pair of right-angularly disposed split sleeve portions 17, 18, which embrace said rock shaft 14 and beam 15, respectively, and which are provided with upper and lower screw clamping means 19, 20.

The upper screw clamping means 19 will be so adjusted as to provide a snug but freely rotatable fit of the split sleeve portion 17 upon the rock shaft 14, the bracket 16 being retained upon the rock shaft 14 by means of a collar 21 having a set screw 22 clamped on the outer end of the rock shaft. The lower screw clamping means 20, however, will be employed for clamping the tubular beam 15 rigidly within the split sleeve portion 18. This arrangement, will, of course, permit any desired longitudinal and rotative adjustment of the tubular beam 15 in the bracket 16 when the screw clamping means 20 is loosened.

A forward portion of the tubular beam 15 is embraced by a lower split sleeve portion 23 of a transverse bearing 24 (Fig. 3), said sleeve portion having a horizontal screw 25 whereby said bearing may be rigidly clamped upon said beam.

The bearing 24 rotatably carries a shaft 26 which is disposed at right angles to the beam 15, and which is provided with a flange 27 against which an abrasive wheel 28 may be clamped by means of an outer flange 29, held by a nut 30 threaded on the outer end of said shaft.

Provision is made of a motor 31 for driving the abrasive wheel 28, said motor being disposed adjacent the opposite end of the beam 15 beyond the bracket 16, and having a base 32 which is secured to said beam 15 by means of a concave bracket 33 and screws 34.

The motor 31 preferably is provided with a control switch 35, and has a pulley 36 for driving the abrasive wheel 28 by means of a belt 37 which is engaged over a relatively large pulley 38 fixed upon the shaft 26.

Thus, it will be seen that the tubular beam 15 may be manually swung downwardly about the rock shaft 14 so as to cause the abrasive wheel 28 to engage a glass sheet S or other work upon the table T, while said wheel is driven at a high speed by the motor 31.

However, in order to limit downward movement of the wheel 28, and thus regulate the depth of the cut made in the glass sheet S, provision is made of adjustable means which comprises an end cap 39 (Fig. 1) secured upon the end of the beam 15 adjacent the wheel 28 by any suitable means, such as set screws 40, 41.

The end cap 39 is provided with a vertically-apertured, integral lug 42 having an angular set screw 43 for adjustably holding a stop rod 44 having a lower end portion 45 which is bent horizontally at right angles thereto, and which is provided with a short length of rubber tubing or other resilient covering 46.

Thus, it will be seen that the stop rod 44 may be vertically adjusted and held by the angular set screw 43 in such a position as to limit downward movement of the wheel 28 and thus control the depth of a concave finger grip 47 which is to be cut in the glass sheet S by said wheel.

As a means for locating and guiding the glass sheet S with respect to the abrasive wheel 28, the pedestal 10 is provided with a vertical base flange 48 which carries an elongated fence or guide rail 49 having a vertical guiding surface which is disposed in a plane parallel to the tubular beam 15, and at right angles to the vertical planes of the rock shaft 14 and of the wheel shaft 26.

A funnel-shaped water receptacle 50 having a manually-operable valve 51 may be provided for applying water to the abrasive wheel 28, so as to facilitate the cutting operation.

The water receptacle 50 is provided with an apertured side arm 52 having a set screw 53, whereby said receptacle may be adjustably supported upon a rod 54 mounted upon the bearing 24.

*Operation*

In operation, the tubular beam 15 will first be adjusted longitudinally in the bracket 16 so that the abrasive wheel 28 will be counterbalanced in the desired degree by the weight of the motor 31, after which the screw clamping means 20 will be tightened so as to clamp the beam 15 firmly in its adjusted position.

It will be understood that this adjustment of the beam 15 may be so regulated that the weight of the wheel 28 will cause it to engage the glass sheet S with the desired pressure. The beam 15 may, of course, be so adjusted longitudinally that the weight of the motor 31 will overbalance the weight of the wheel 28, and thus permit the pressure of said wheel upon the work to be obtained entirely by downward manual pressure on the beam 15.

If it is now desired to form a finger grip 47 in the glass sheet S, for example, the stop rod 44 will be vertically adjusted in the lug 42 so that the resilient covering 46 upon the lower end 45 of said stop rod will engage the glass sheet S when the fingergrip 47 has been cut to the desired depth. The motor 31 will then be placed in operation, and the wheel 28 lowered upon the glass sheet S. The wheel 28 will then cut its way into the sheet S until the finger grip 47 has been formed to the desired depth, at which time the covering 46 on the lower end 45' of the stop rod 44 will engage the sheet S in the position indicated at 46', and thus will stop the effective operation of the wheel 28, which will then be disposed in the position indicated at 28'.

The formation of a stripe or groove in the glass sheet S will be accomplished in substantially the same manner as described above, the glass sheet S, however, being moved longitudinally in contact with the guide rail 49 during operation of the abrasive wheel 28. The stop rod 44, will, of course, remain effective to limit the depth of the stripe or recess formed by the wheel 28.

If the operator should desire to form a crescent-shaped fingergrip in the glass sheet S, he will merely loosen the screw clamping means 20, and rotatably adjust the tubular beam 15 and the parts mounted thereon, so as to bring the abrasive wheel 28 into the desired inclined position, such as is shown for example at 28'' in Fig. 3. This rotative adjustment of the beam 15 will also permit V-grooves to be formed by flat-faced wheels. However, V-faced wheels may be used for forming V-grooves without requiring rotative adjustment of the beam 15.

When the tubular beam 15 is adjusted rotatably in the bracket 16, the stop rod 44 may, if desired, be restored to a vertical position after first loosening the set screws 40, 41, so as to permit rotation of the end cap 39.

It will be understood that the abrasive wheel 28 may be of substantially any desired size or type, and that the shaft 26 may be employed equally well for supporting other types of wheels such as buffing wheels or saws.

If a wheel of large diameter is used, the operator may wish to raise the level of the tubular beam 15. This may be readily accomplished merely by inverting the position of the bracket 16, so that said beam will be disposed above the rock shaft 14.

In order to invert the bracket 16, the screw-clamping means 20 will be loosened and the collar 21 will be removed, so that the bracket 16 may be removed from the rock shaft 14, rotated with respect to the beam 15, and then reapplied to the rock shaft 14.

Further, the machine herein disclosed may be readily adapted for use as a swing saw merely by attaching the pedestal 10 to a vertical wall or column so that the tubular beam 15 will be disposed in an approximately vertical depending position. When the machine is used as a swing saw, the end cap 39 and the stop rod 34 may be removed and replaced with a suitable handle, and the bearing 24 will be applied closely adjacent the lower end of the beam 15.

While there has been disclosed in this specification one form in which the invention may be embodied, it is to be understood that this form is shown for the purpose of illustration only, and that the invention is not to be limited to the specific disclosure, but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a machine for mitering a sheet of glass, the combination comprising a base, a supporting bracket mounted on said base and upstanding therefrom, a horizontal shaft adjustably mounted on the top of said bracket, a unitary sleeve depending from said shaft and comprising a pair of upper and lower split bearing bores arranged at right angles to each other, said upper bearing bore being swingably mounted on said shaft, an elongated beam twistably and slidably mounted in said lower bearing bore, means threadedly connected to said split bearing bores to adjust the frictional engagement of said bearing bores upon said shaft and beam, respectively, a rotatable glass abrading wheel supported on one end of said beam and spaced therefrom in parallel relationship thereto, a motor drivingly connected with said wheel, said motor and said wheel being mounted on opposite ends of said beam and said bracket for counterbalancing each other.

2. The invention as defined in claim 1, in which said beam is provided with an end cap beyond the position of said wheel and having a vertically adjustable stop rod carried by said cap, said rod having a horizontally bent lower end engageable with said glass whereby the downward swinging movement of said beam will be limited by said stop.

JOHN B. TAVANO.

REFERENCES CITED

The following references are of record in the file of this patent:

UNITED STATES PATENTS

| Number | Name | Date |
| --- | --- | --- |
| 1,166,640 | Shaw | Jan. 4, 1916 |
| 1,434,440 | Knudsen | Nov. 7, 1922 |
| 1,638,122 | Jull | Aug. 9, 1927 |
| 2,160,311 | Kaasa | May 30, 1939 |
| 2,383,741 | Robinson | Aug. 28, 1945 |

FOREIGN PATENTS

| Number | Country | Date |
| --- | --- | --- |
| 51,430 | Sweden | Apr. 12, 1922 |
| 530,875 | France | Oct. 11, 1921 |